Figures 1, 2:
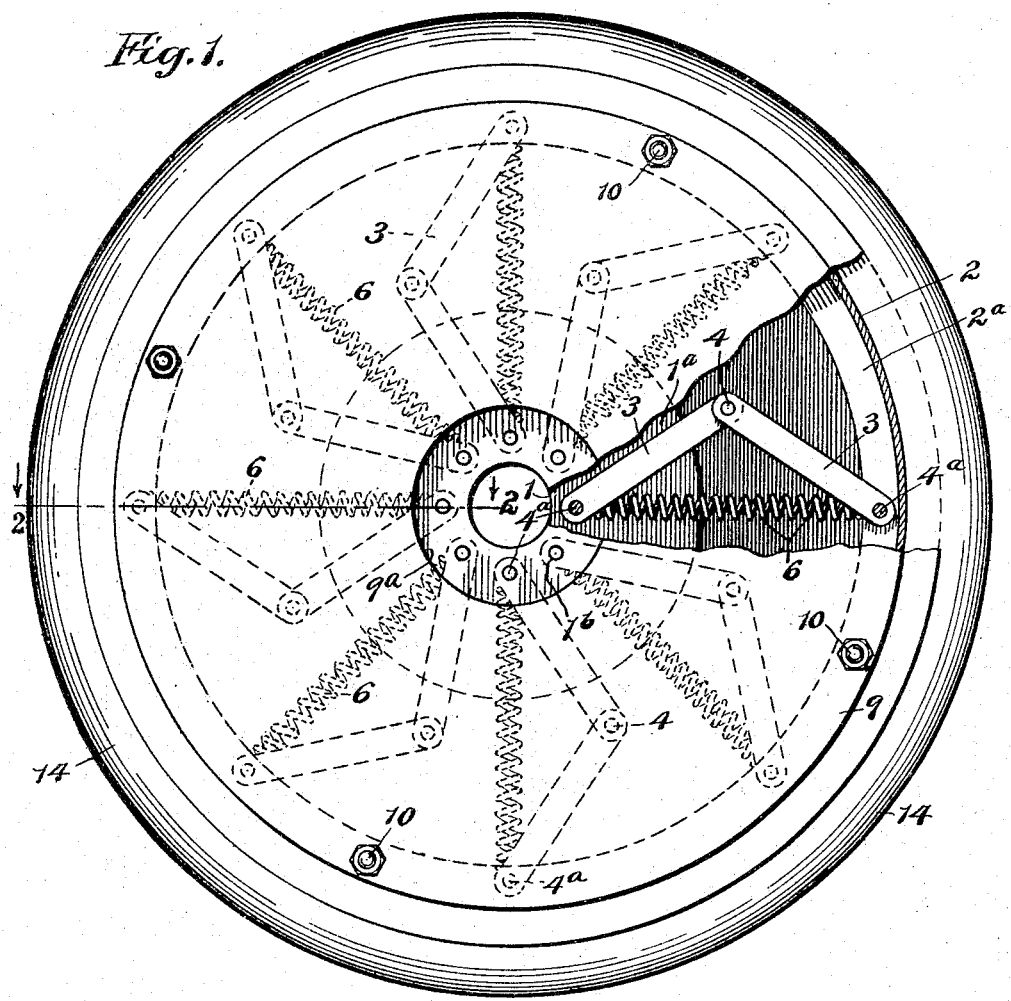

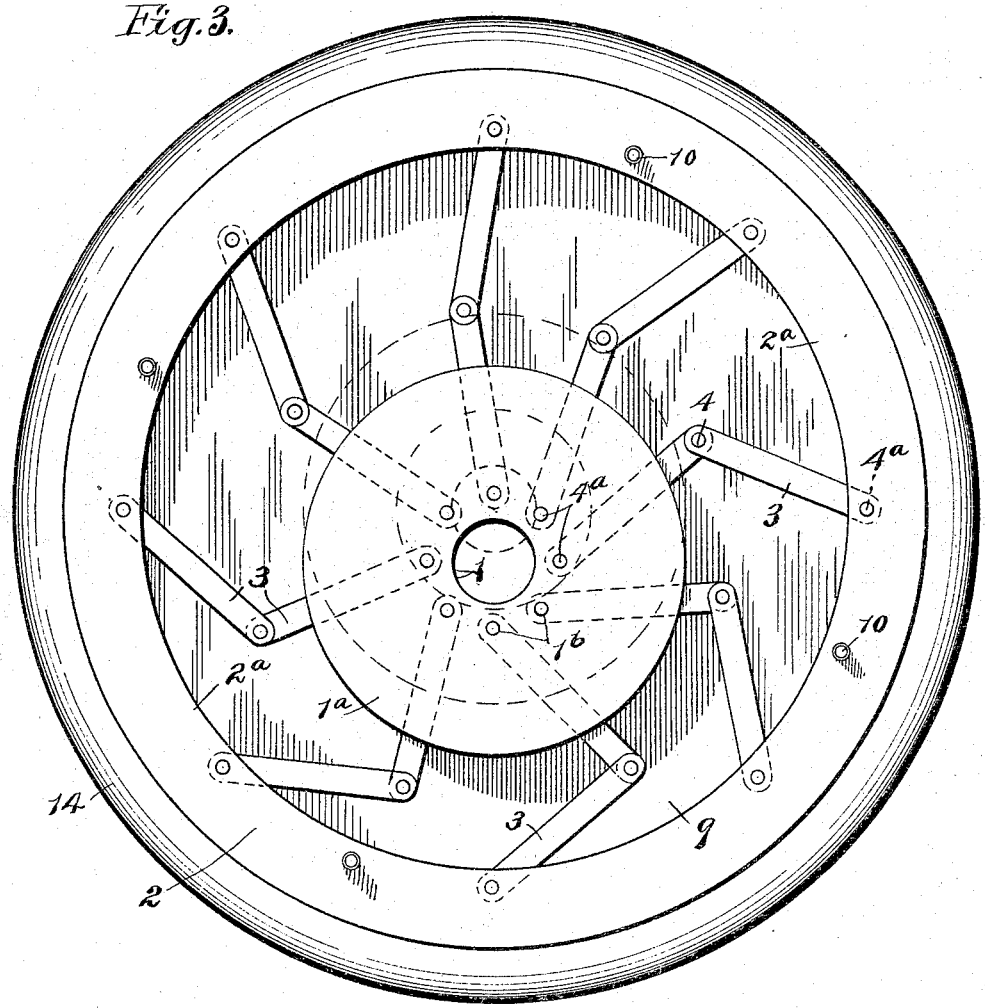

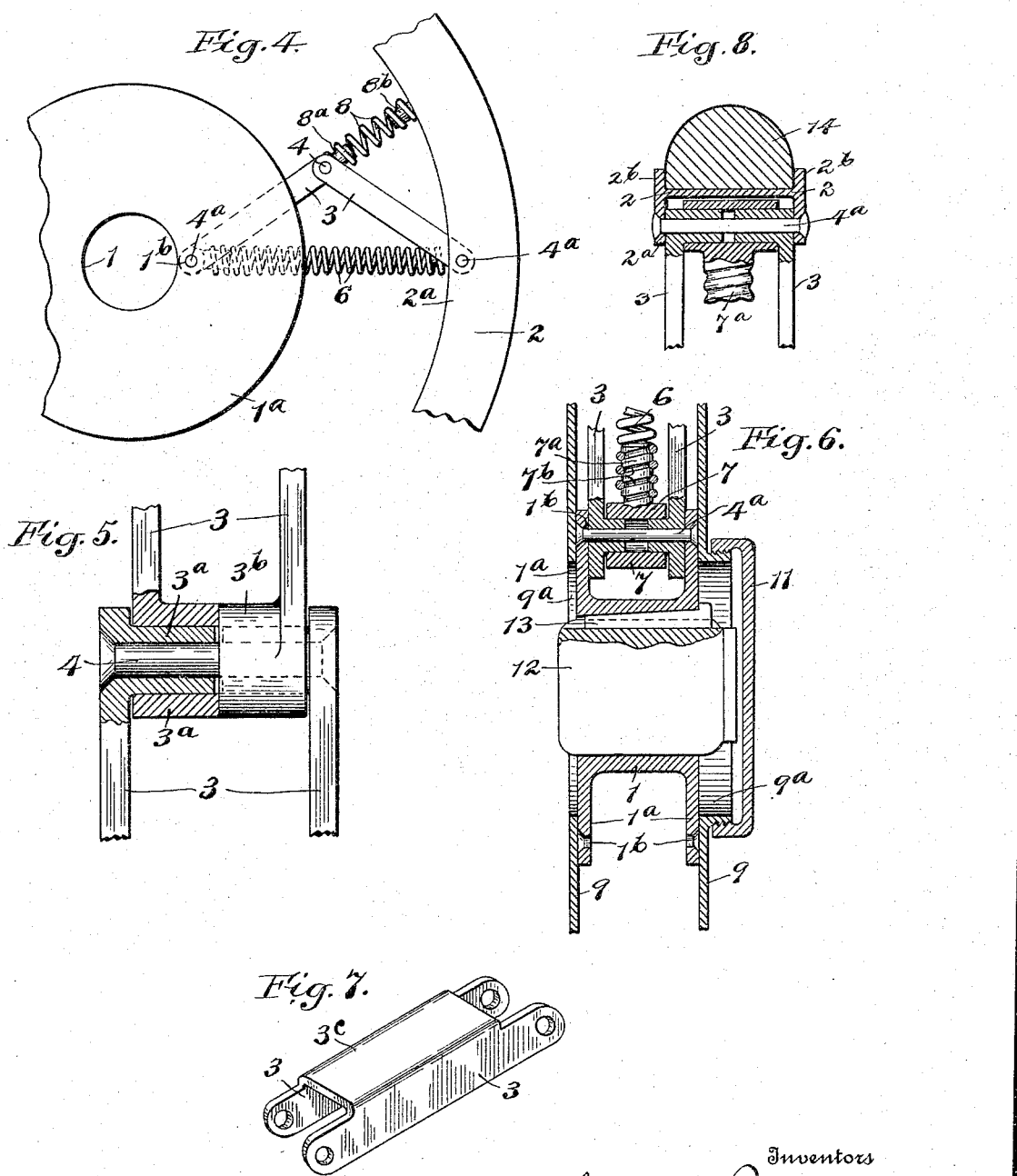

UNITED STATES PATENT OFFICE.

GEORGE W. REDBURN AND CHRISTIAN HEILRATH, OF SACRAMENTO, CALIFORNIA.

RESILIENT VEHICLE-WHEEL.

1,182,584.

Specification of Letters Patent.

Patented May 9, 1916.

Application filed June 23, 1915. Serial No. 35,746.

*To all whom it may concern:*

Be it known that we, GEORGE W. REDBURN and CHRISTIAN HEILRATH, citizens of the United States, residing at Sacramento, in the county of Sacramento and State of California, have invented certain new and useful Improvements in Resilient Vehicle-Wheels, of which the following is a specification.

Our invention relates to improvements in resilient vehicle wheels, the primary object of the invention being to provide a generally improved resilient or spring resisted vehicle wheel having its parts so arranged and adjusted as to provide the requisite elasticity, and stability and at the same time eliminate the various objectionable features frequently found in vehicle wheels of this class.

A further object of the invention is to improve the construction of the movable spoke members and provide the proper form of connections or bearings between the wheel-hub and felly members whereby to brace the wheel as a whole as against lateral stresses at the hub and felly and at the same time provide for the requisite movements of the hub and felly members toward and from each other as in passing obstructions, taking up vertical shocks and vibrations, and the like.

A still further object of the invention is to provide improved spoke members adapted for use either as suspension or compression spokes, or as combined suspension and compression spokes, and provided with improved spring members adapted to control or regulate the sensitiveness of the wheel felly with respect to superposed loads and the impact due to passing obstructions to meet the varying demands of actual service.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is a side elevation of a resilient wheel of the suspension type constructed in accordance with this invention, a portion of one of the disk shields or casings being broken away for the purpose of clearer illustration of the parts. Fig. 2, a cross sectional view taken on line 2—2 of Fig. 1. Fig. 3, a side elevation under extreme load or depression, with the toggle link spoke springs and one of the shields removed, the toggle spokes being shown in proper relative position. Fig. 4, a segmental side elevation of the hub and felly portions of a modification embodying a combined suspension and compression wheel. Fig. 5, an enlarged detail view of a modified form of bearing or connection at the inner or knuckle ends of the toggle link spokes. Fig. 6, a central cross sectional view through the wheel hub and the hub bearing portion of one of the toggle link spokes. Fig. 7, a perspective view of a further modified form of toggle link. Fig. 8, a cross sectional view through the wheel felly and felly bearing portion of one of the toggle link spokes.

Similar numerals of reference designate like parts throughout all the figures of the drawings.

The improved resilient vehicle wheel comprises a hub member 1, provided with side bearing disks $1^a$, the latter being provided at suitable intervals with bolt or rivet receiving openings $1^b$.

As a means for resiliently connecting and supporting the hub and felly members 1 and 2, respectively, as well as providing means whereby said hub and felly members 1 and 2, may be moved toward and from each other and also supporting the latter as against lateral stresses or displacement, a plurality of toggle link spoke members 3, are provided, said spoke members being made up of toggle links arranged in pairs and being connected at their inner or knuckle ends by means of bearing members 4, the outer ends of the toggle link spoke members being arranged between and connected to circumferentially arranged felly spoke bearing flanges $2^a$, by means of transversely extending bearing members $4^a$.

If desired, the inner or knuckle ends of the toggle links 3, may be held in spaced relation to each other by means of spacing or separating springs 5, (see Fig. 2) surrounding the bearing members 4, or preferably by means of male and female bearing portions $3^a$, and $3^b$, respectively, as shown most clearly in Fig. 5 of the drawings. If desired, the toggle links may be arranged in pairs and spaced from each other by means of an integral web portion $3^c$, as shown most clearly in Fig. 7 of the drawings.

As a means of resiliently connecting the outer or hub and felly bearing portions of the toggle link spokes to each other, as well as resiliently connecting the hub and felly members of the wheel to each other, coiled suspension springs 6, are provided, said springs 6, being preferably connected to the bearing members 4ª, through the medium of spring bearing members 7, the latter being preferably provided with spring attaching lugs 7ª, provided with spirally arranged grooves 7ᵇ, adapted to receive and contain the adjacent convolutions of the springs 6. The spring bearing members 7, also act as spacing members to hold the hub and felly bearing ends of the links 3, in proper spaced relation to each other as well as provide a proper bearing surface for the adjacent or contiguous parts.

If it is desired to transform the wheel into a combined suspension and compression wheel, or in other words, lessen the sensitiveness of the toggle link spokes to carry an increased load, the inner or knuckle ends of the toggle links may be further braced by means of compression springs 8, interposed between the wheel felly 2, and the knuckle portions of the links by means of a bearing member 8ª, at one end and a second bearing member 8ᵇ, at the other as shown most clearly in Fig. 4 of the drawings.

It will be observed that the toggle links 3, forming the spoke members are arranged in transversely extending pairs and that the bearing disks or flanges 1ª, of the hub member, and the felly flanges 2ª, of the felly, form channeled hub and felly members to receive and contain the respective pivoted ends of the toggle link spoke members and that the latter are arranged within and abut against the inner sides of the flanges 1ª and 2ª, thereby maintaining the parts in alinement whereby to brace the wheel as a whole as against lateral stresses at the hub and felly.

If desired, the spoke and spring members may be shielded by means of disk shields 9, secured to the wheel felly 2, by means of attaching bolts 10, said shields being provided with central openings 9ª, adapted to permit the hub portion of the wheel to have the requisite movements. The disk shield 9, at the outer side of the wheel may be provided with a threaded cap 11, to cover the end of the hub. If desired, the hub 1, may be provided with a removable hub-box 12, secured by means of a key member 13.

The wheel felly 2, may be provided with outwardly extending flanges 2ᵇ, to receive and contain a tire 14, of any suitable and convenient form.

From the foregoing description, taken in connection with the accompanying drawings, the operation and advantages of our invention will be readily understood.

Having thus described some of the embodiments of our invention, what we claim and desire to secure by Letters Patent, is,—

1. In a resilient wheel, the combination with circumferentially channeled hub and felly members; of toggle link spoke members arranged in pairs and spaced from each other by means of an integral web portion, said spoke members being pivotally mounted within the channeled portions of said hub and felly members, spring connecting bearing members pivoted between said spoke members, spring connecting and spoke spacing members mounted in and connected to the pivoted portions of said toggle link spoke members, suspension springs connected to said spring connecting and spoke spacing members at the hub and felly portions of said wheel, and compression springs interposed between said bearing members at the knuckle portions of said toggle link spoke members and said felly member.

2. A resilient wheel, comprising channeled hub and felly members, toggle link spoke members arranged in transversely extending pairs and connected and spaced from each other by means of integral web portions, said toggle link spoke members having their outer ends pivoted within the channeled portions of said hub and felly members, pivoted bearing and spacing members between the pivoted outer and knuckle portions of said spoke members, and means connected to and interposed between said bearing and spacing members for resiliently resisting the movements of said hub and felly bearing portions and the knuckle portions of said toggle link spoke members.

3. A resilient wheel, comprising hub and felly members provided with spoke bearing flanges extending toward each other, toggle link spoke members including integral web portions arranged in transversely extending pairs and pivotally mounted and interposed between said spoke bearing flanges, bearing members interposed between the pivoted portions of said toggle links at the hub and felly portions of said wheel, bearing pins extending through the latter, spring connecting and spoke spacing bearing members interposed between the knuckle portions of of said toggle link spoke members, and tension and compression springs connected to and interposed between said bearing members of said hub and felly members, and said knuckle portions of said toggle link spoke members and said felly member, respectively.

4. A resilient wheel, comprising channeled hub and felly members, toggle link spoke members arranged in transverse pairs within and between said channeled hub and felly members, spacing members between the knuckle ends of said toggle spoke members, bearing pins extending through said hub and felly members and the ends of said toggle links, springs interposed between said spacing and felly members, bearing members mounted on said bearing pins and interposed between the ends of said toggle links, and suspension coiled springs extending between and connected to said last mentioned bearing members.

In testimony whereof we have affixed our signatures in presence of two witnesses.

GEORGE W. REDBURN.
CHRISTIAN HEILRATH.

Witnesses:
CARRIE B. REDBURN,
W. B. REDBURN.

Copies of this patent may be obtained for five cents each, by addressing the "Commissioner of Patents, Washington, D. C."